Figure 1:
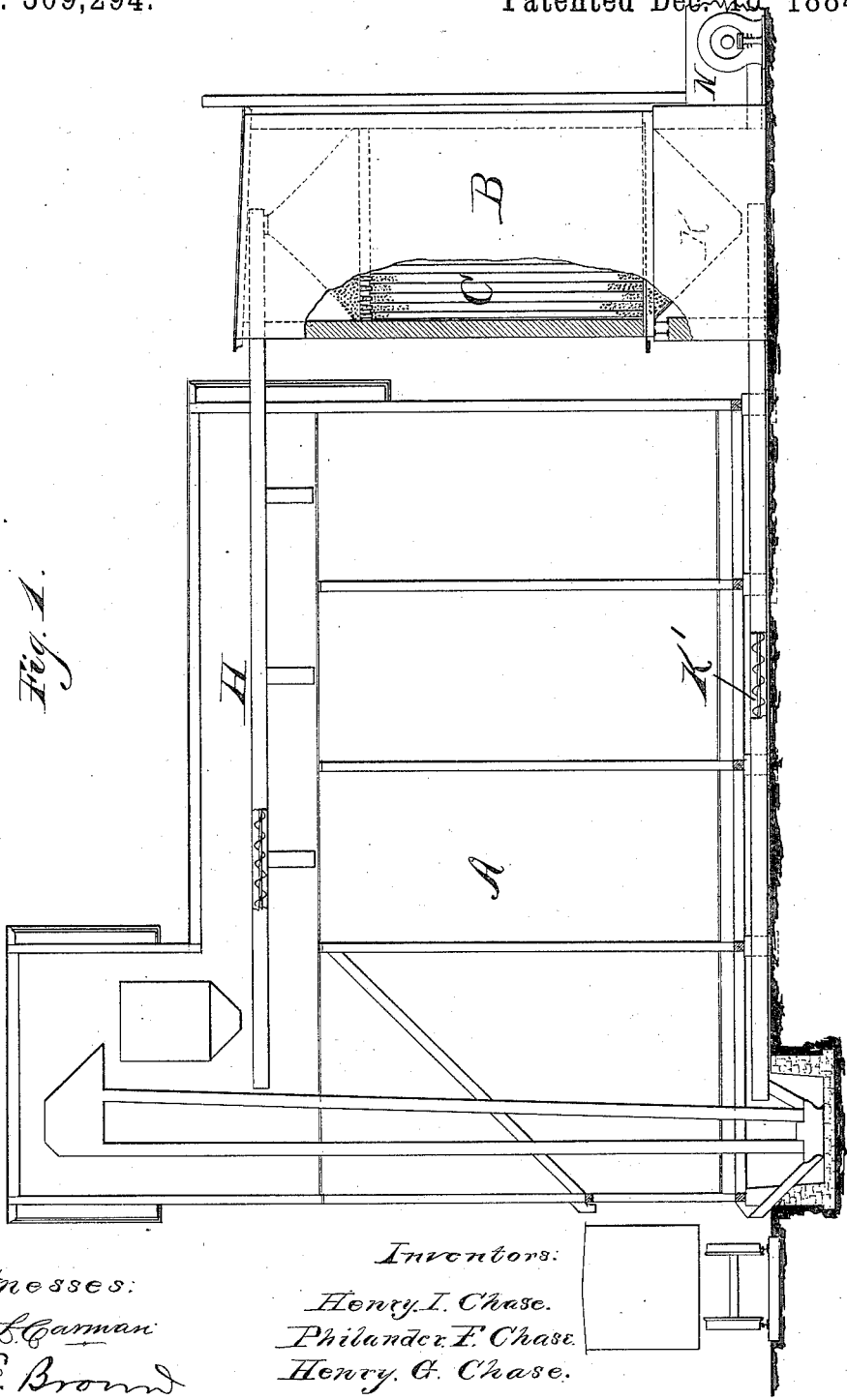

(No Model.)  H. I., P. F. & H. G. CHASE.  5 Sheets—Sheet 2.
GRAIN DRIER.
No. 309,294.  Patented Dec. 16, 1884.
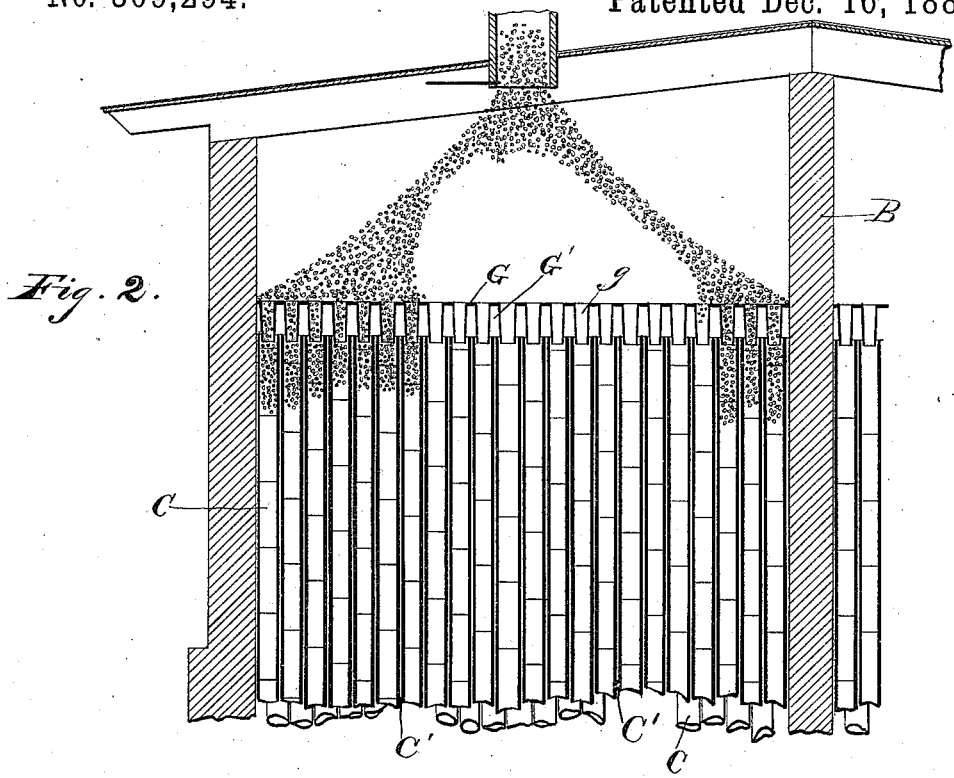
Fig. 2.
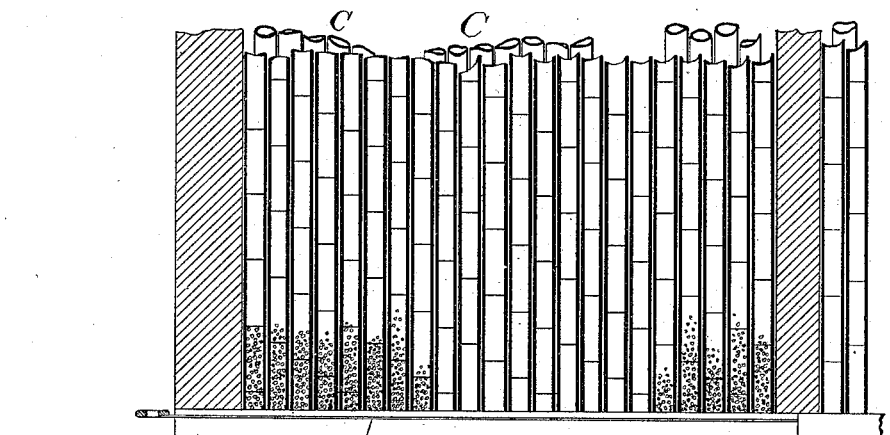
Witnesses:
Chas. L. Carman
J. E. Brown
Inventors
Henry I. Chase.
Philander F. Chase.
Henry G. Chase.
By Munday, Evarts & Adcock,
Their Attorneys.

(No Model.)

H. I., P. F. & H. G. CHASE.
GRAIN DRIER.

No. 309,294. Patented Dec. 16, 1884.

5 Sheets—Sheet 4.

Witnesses:
Chas. L. Carman
J. E. Brown

Inventors
Henry I. Chase.
Philander F. Chase.
Henry G. Chase.
By Munday, Evarts & Adcock
Their Attorneys.

(No Model.)
H. I., P. F. & H. G. CHASE.
GRAIN DRIER.
No. 309,294.  Patented Dec. 16, 1884.
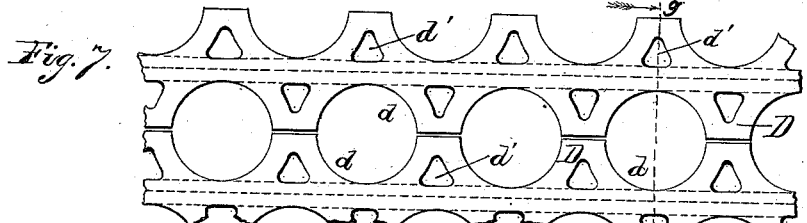
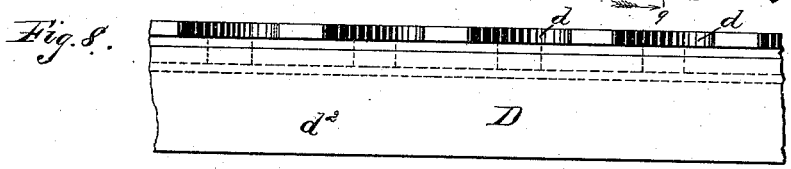
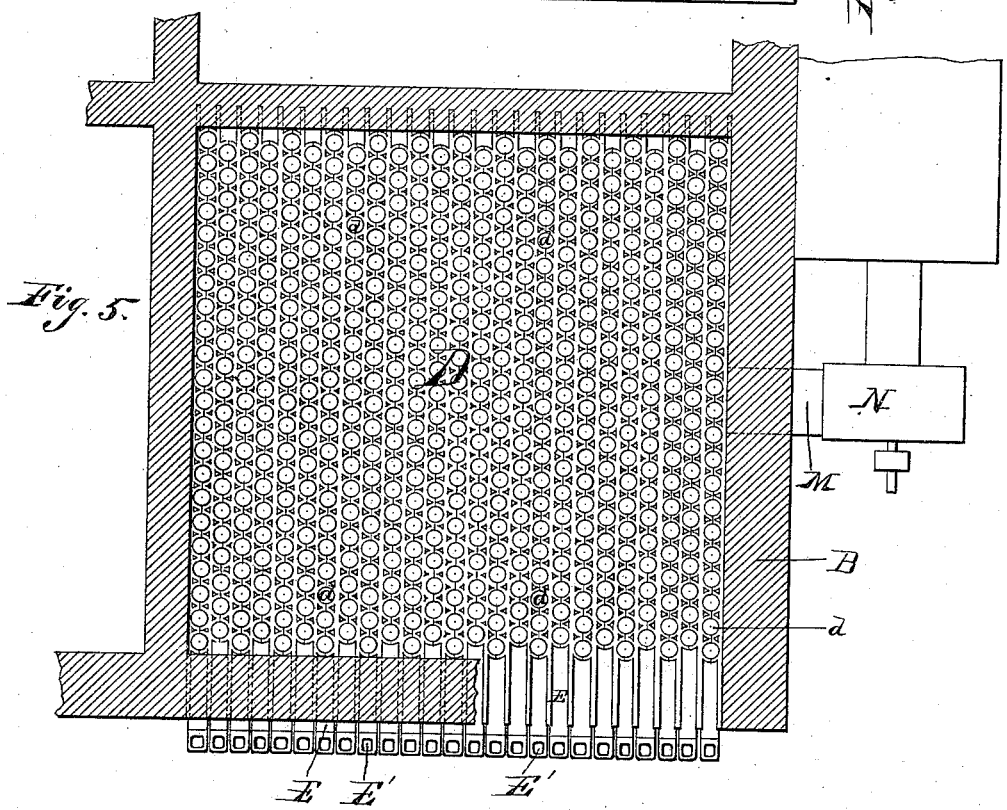
Witnesses:
Chas L Carman
J. E. Brown
Inventors
Henry. I. Chase.
Philander. F. Chase.
Henry G. Chase.
By Munday, Evarts & Adcock
Their Attorneys.

UNITED STATES PATENT OFFICE.

HENRY I. CHASE, PHILANDER F. CHASE, AND HENRY G. CHASE, OF CHICAGO, ILLINOIS, ASSIGNORS TO THE CHASE ELEVATOR COMPANY, OF SAME PLACE.

GRAIN-DRIER.

SPECIFICATION forming part of Letters Patent No. 309,294, dated December 16, 1884.

Application filed January 21, 1884. (No model.)

*To all whom it may concern:*

Be it known that we, HENRY I. CHASE, PHILANDER F. CHASE, and HENRY G. CHASE, citizens of the United States, residing in Chicago, in the county of Cook and State of Illinois, have invented a new and useful Improvement in Grain-Driers, of which the following is a specification.

The object of our invention is to provide a process of and apparatus for drying damp grain rapidly and in large quantities, and without danger of scorching or tainting the grain by exposing it to great heat, so as to meet the requirements of elevators and other buildings where thousands of bushels of grain are handled or stored.

Our invention consists in drying the grain by absorption by exposing it to a dry porous absorbent material, like burnt clay, for a few hours, or until the moisture is absorbed from the grain, and then removing the grain from the absorbent material and drying the latter by exposing it to currents of dry and, preferably, heated air. When the absorbent material is in this way or by other suitable means again dried, another charge of damp grain is applied thereto, and so on. In this way, as the absorbent material is dried after being separated from the grain, there can be no danger of tainting or scorching any portion of the grain by the heat, as the grain need not be exposed thereto at all, and while the absorbent material is being dried any desired degree of heat can be applied, so as to dry the absorbent material with dispatch.

In practicing the invention we preferably use round burnt clay tile, and arrange them contiguous to each other in vertical columns, one above another, in a closed kiln, preferably of sufficient size to hold one or more car-loads of grain at a time. The hollow tile entirely fill the kiln from top to bottom, so that the contiguous tile brace and hold each other in place and form continuous tubes from top to bottom. The tile are supported on a floor having holes or perforations therein corresponding to the holes in the tile, and they are arranged in rows, so that a single slide or door may close and open the bottoms of each row or tier of the tiles. A perforated floor having tubes entering the mouth of the tile is provided at the top thereof for the purpose of directing the damp grain into the tile. A hopper and grain-conveyer are provided at the bottom of the kiln for the purpose of removing the dried grain as it is discharged from the tile when the bottoms of the same are open by moving the slides. A fan or blower in connection with a suitable furnace or heating device is provided for the purpose of directing a current of dry hot air up through the tile to dry the same after the charge of grain has been removed therefrom. And we also deem it preferable to provide means for directing the currents of air up through the interstices between the tile, in order to facilitate the drying thereof by exposing both the interior and exterior surfaces of the tile to the hot and dry air. This we do by making openings in the floor or tile-supports connecting with the spaces between the tile. The tile, being dried, are filled with the damp grain from the top. The grain is allowed to remain therein until it is sufficiently dry, when the doors or slides at the bottom of the tile are opened and the dry grain quickly drawn off by means of the conveyer or other suitable elevator mechanism. Currents of dry hot air are then admitted to the kiln from the furnace or heater and the tile quickly dried, when the same may be again filled with damp grain and the process repeated. In this way a kiln full of grain consisting of one or more car-loads may be dried in from one to three hours, depending upon the degree of dampness of the grain, and after the grain is removed the tile may be dried out in half an hour or less time. If preferred, while the charge of grain is being dried, currents of dry and moderately heated air may be passed continuously through the space between the tile, a provision being made between the top of the tile and the floor above the same which supports the grain for the escape of the hot air as it passes through these interstices. It facilitates the operation of our process and apparatus to employ currents of hot air; but the tile may, of course, be dried by forcing currents of dry cold air up through the tile, or the spaces between the same, and our invention is not confined to the use of hot air. Very good results can be attained, especially in the summer time or on a dry day, by employing in our invention currents of cold or unheated air for drying the tile. We deem it preferable to use tile of about three inches interior diameter, and these, of course, may be of any shape, as round, hexagonal, square, rectangular, &c. Ordinarily in practicing our invention it is not necessary that the grain remain in the kiln until every portion of it becomes completely dry. That portion of the grain that is near the surface of the tile will become very dry, while that portion which is at the center of the tile will still be slightly moist; but after the grain is drawn off from the kiln and remains a short time in the bin, the moisture will be evenly distributed throughout the whole mass of grain, the drier portions absorbing the moisture from that which is more damp. If the grain is left in too long, until every portion of it becomes completely dry, it, as is well known, has a harsh, brittle character, and is not so merchantable nor so well adapted to milling and other purposes.

In the accompanying drawings, which form a part of this specification, and in which similar letters of reference indicate like parts, we have shown what we deem to be the best means known to us of practicing our invention.

Figure 3:
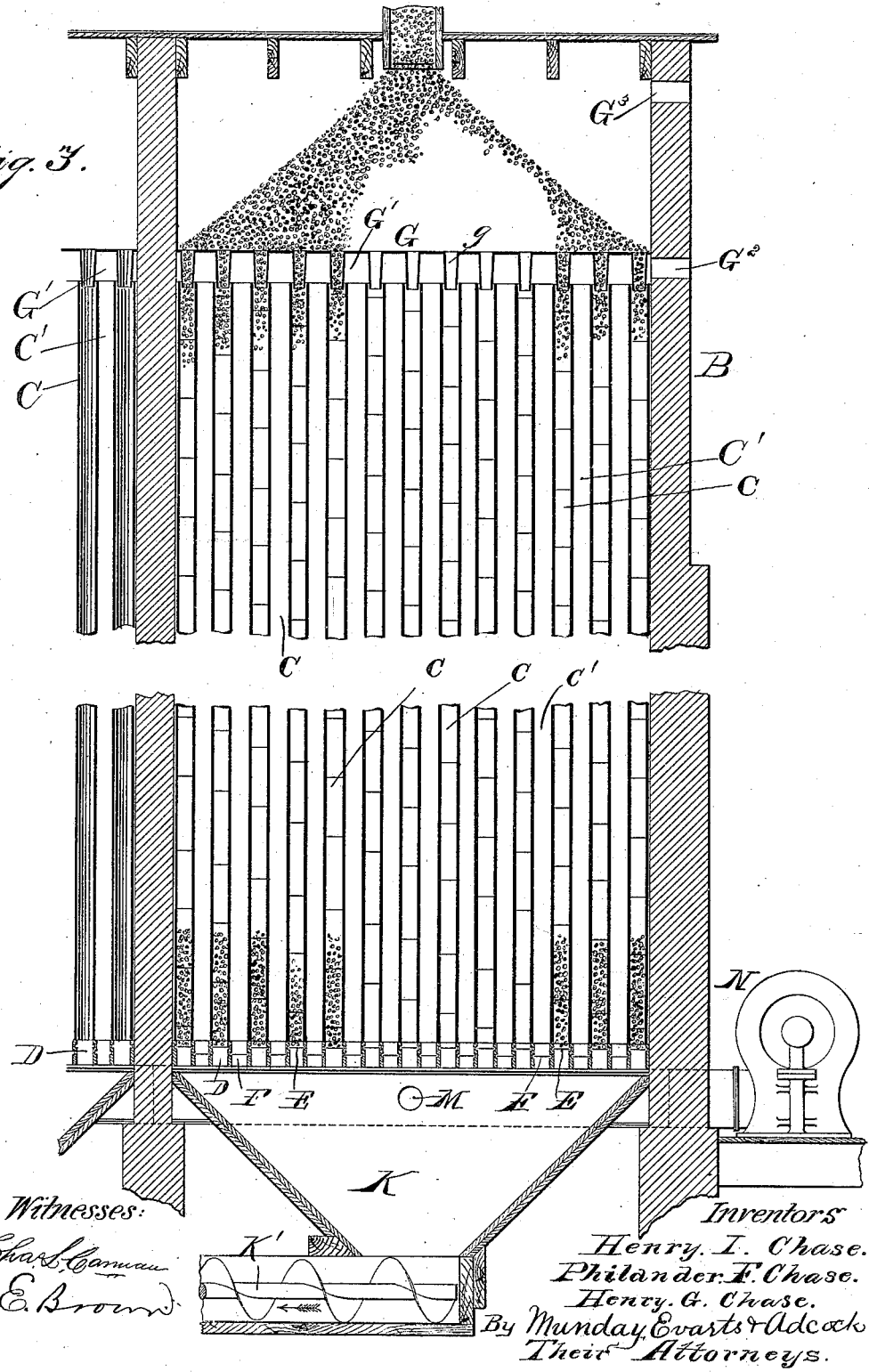
Figure 4:
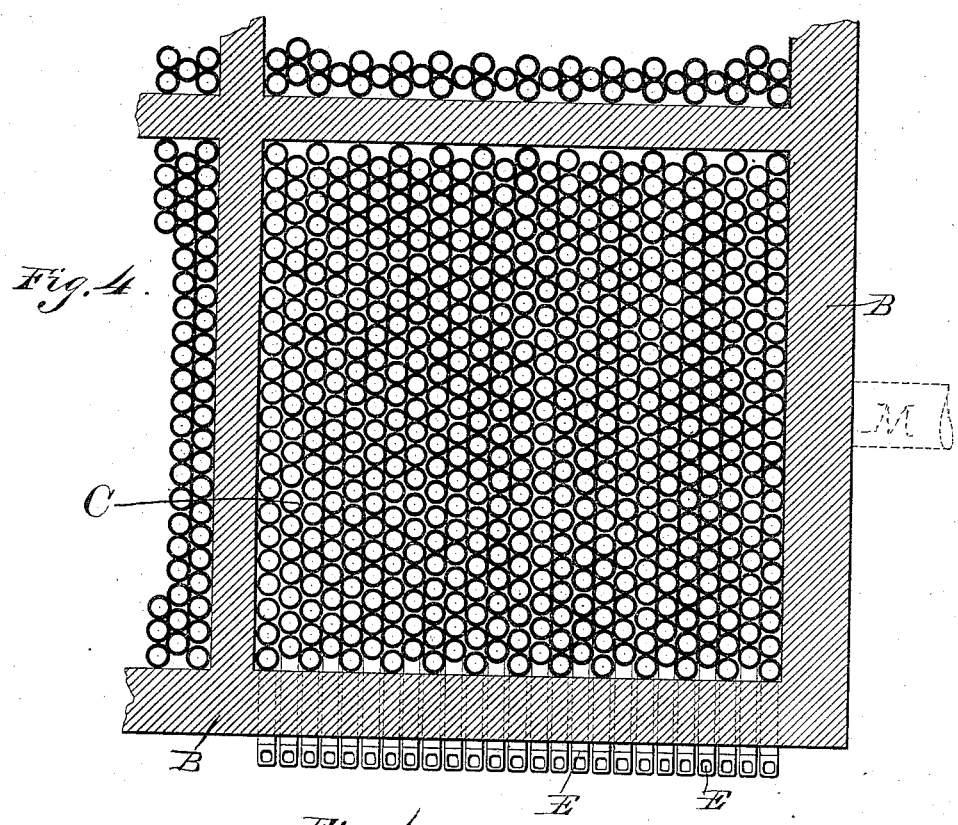
Figure 6:
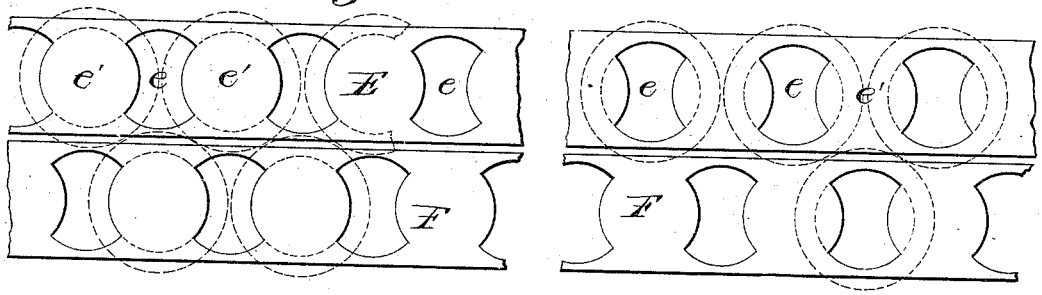
Figure 10:
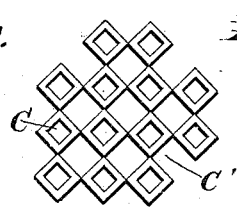
Figure 11:
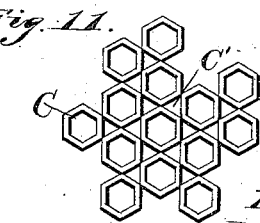
Figure 12:
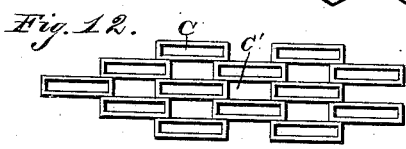

In said drawings, Figure 1 is a side elevation of a device embodying our invention. Figs. 2 and 3 are central vertical sections taken at right angles to each other through the kiln. Fig. 4 is a sectional view of the kiln, showing a plan of the tile arranged therein. Fig. 5 is a plan view of the girders or supports upon which the tile rest. Fig. 6 is an enlarged detail view of the grain door or slide by which the tile are opened and closed at the bottom. Figs. 7 and 8 are enlarged plan and side views, respectively, of one of the girders upon which the tiers of tile rest, and Fig. 9 is a cross-section of the same. Figs. 10, 11, and 12 show modified forms of the tile.

In the drawings, A represents an elevator or building in which the grain is stored or is to be stored. B is the kiln, and C are the tile, set one above another, so as to form a continuous tube from top to bottom and arranged in rows extending across the kiln.

The floor or bottom of the kiln, upon which the tile rest, consists, preferably, of a series of bars or girders, D, having notches $d$ in their edges, conforming to half the interior of the tile, so that when two of these bars are placed together the notches $d$ will form an opening in the floor conforming to the interior of the tile. These supporting bars or beams are also provided with holes $d'$, which open into the spaces between the tile. The supporting-bars have a strengthening rib or flange, $d^2$, which is provided with grooves or notches $d^3$ and $d^4$ in its opposite sides. The grooves $d^3$ of two contiguous bars form a guide for the slide or door E, which closes the tile at the bottom when the same is filled with grain. The grooves or notches $d^4$ in the opposite edges of two contiguous bars form a guide for the slide F, which closes the holes $d'$, opening into the spaces between the tile. The doors or slides E consist of a flat strip, preferably of sheet-iron, having a series of openings, $e$, corresponding to the space between the two holes of two contiguous tiles, through which openings the grain may be discharged when the slide is moved to bring such openings under the tile. The circular part $e'$ of the slide between the openings $e$ closes the tile when the slide is moved to register therewith.

G represents a floor near the top of the kiln above the tile, which floor is provided with a series of tubes or funnels, $g$, by which the grain is directed into the interior of the tile. A space, G', is left between the tile and this floor, which space communicates with the interstices C' between the tile, so that a current of air may pass from these interstices out through the opening or flue $G^2$ in the side of the kiln.

$G^3$ represents a flue or opening through which the air from the interior of the tile may pass out after the grain is removed from the kiln.

H represents a conveyer, by which the grain is delivered into the kiln at the top.

K is a hopper at the bottom of the kiln, by which the dried grain is delivered therefrom when the slides E are opened.

K' represents a screw or other suitable conveyer for delivering the grain back into the elevator or other receptacle. The dry air is admitted into the closed space L between the hopper K and the floor upon which the tile rest through an air passage or pipe, M, which leads from a suitable blower and heater apparatus, N. The construction of this blast apparatus N, whether it is designed to supply a hot or simply a cold blast, we have not deemed it necessary to show in detail, as any ordinary apparatus of this kind may be used, and their construction is well known. We deem it preferable to employ a hot-blast apparatus, and that is what we have indicated at N, the same consisting, for example, of a case inclosing a fan or blower and a quantity of steam-coil for heating the air. The kiln should preferably be built large enough so that the tile filling the same will hold one or more car-loads of grain at a time, and any number of these kilns desired may be built contiguous to each other. The doors or slides E are each provided with a handle, E', at their end, through the opening of which a lever may be inserted, in order to open the slide when the tile are filled with grain. Of course it will be understood that these slides only have to be moved about half the diameter of the tile, in order to discharge the grain therefrom.

In the operation of our apparatus, especially when very damp grain is to be dried, it is sometimes desirable, after the grain has stood some time in the tile, say a half an hour, to open the slides slightly or momentarily, and discharge a small quantity of grain from the tile-tubes, as such discharging will stir up or cause the grain to turn over or move about in the tile-tube, and bring other damp portions of the grain in contact with the surface of the tile, and thus facilitate the drying of the same, and this operation may be repeated at intervals. Two or more charges or kilns full of grain can sometimes be dried in succession before it is necessary to dry out the tile by passing the currents of dry hot air up through the same, especially if the grain does not happen to be very damp. Other means than as herein shown may of course be employed for supporting the tile, for opening and closing the bottom of the kiln, or for heating and passing the heated air up through the kiln; and other forms and arrangements of the tile or other absorbent material may be used than that shown. If preferred, the grain may be admitted to the spaces between the tile as well as inside the same, or to the interstitial spaces only, instead of inside the tile, as herein shown.

We herein make no special claim to that modification or particular form of our invention wherein currents of cold air are used to dry the tile after the grain is removed, and wherein the interstices between the tile are closed or filled with cement or other similar material while the grain inside the tile is being dried, that form of the apparatus being specially adapted to use in elevators or warehouses and other like buildings where absolute freedom from danger of fire is essential, and the same is made the subject of a separate application herewith filed.

We are aware that heretofore grain has been dried by absorption, and we do not therefore claim the same, broadly; but previous to our invention the absorbent material has been dried only by exposing it to heat while the grain was in contact therewith, thus not only endangering the scorching or tainting of the grain, but rendering the process extremely slow, as the wet grain is not only kept always in contact with the moister surface of the tile, while its drier surface is the one exposed to the heat, but also rendering it impossible to employ but a limited degree of heat to dry the tile because of the grain being in contact therewith. By our improvement the drying of the grain and the absorbent material are alternate. The grain is first dried by the dry tile with which it is in contact absorbing its moisture, and then after the grain is removed the tile itself is dried by exposing it to heat or dry hot air. In this way the heat is admitted to the moist surface of the tile, and any suitable degree of heat may be employed without danger of injuring the grain, because it is not present at this stage or step of the process.

The particular form or modification of the apparatus or kiln specially designed for use of dry cold air to dry the tile after the grain is removed, as well as that construction of the kiln wherein the interstices between the tile are filled in with cement or other material, are made the subject of a separate application filed of even date herewith, and are not, therefore, herein specifically claimed.

We do not herein claim the process of drying grain by alternately exposing the grain to dry absorbent material like burnt clay tile, then separating the grain from the absorbent material, and finally drying the tile; but such process we reserve for the subject of another application to be filed prior to the issue of a patent upon this application.

We claim—

1. The combination of a kiln, a series of tiles filling the same, arranged one above another and contiguous to each other, so as to be self-bracing, a floor or support for the tile, having openings therein through which the grain may be discharged, and other openings communicating with the spaces between the tile, slides or doors for closing said openings, in order to retain the grain in contiguity with the tile until it is dried, and means for drying out the tile from both the inside and outside of the same when the grain is removed from the kiln, substantially as specified.

2. The combination, with a kiln, of a series of burnt clay tile arranged one above another to form continuous tubes contiguous to each other and self-bracing, a floor to support the tile, having openings therein communicating with the interior of the tile and with the interstices between the same, and an air pipe or passage leading into the kiln and connected with a furnace or heater for heating the air, and a blower or device for forcing currents of hot air from the furnace or heater through the tile and through the spaces between the tile for the purpose of drying the same, substantially as specified.

3. The combination, with a kiln filled with burnt clay tile arranged in contiguous self-bracing columns, means for delivering the grain into the tile, supports for the tile having openings registering therewith, and also openings registering with the spaces between the tile columns, means for forcing currents of hot air up through the tile and the spaces between the same after the grain is removed, said spaces between the tile also communicating with a flue leading out of the kiln, so that currents of dry air may be passed through said spaces while the tile are filled with grain, substantially as specified.

4. The combination, with a kiln filled with burnt tile in rows of contiguous self-bracing columns or tiers, of a floor or support for said tile, consisting of a series of bars, D D, having openings $d$ and $d'$, communicating, respectively, with the interior of the tile and the spaces between the tile, and provided with grooves or guides $d^3$ $d^4$, slide or door E mounted in said grooves, substantially as specified.

HENRY I. CHASE.
PHILANDER F. CHASE.
HENRY G. CHASE.

Witnesses:
 TAYLOR E. BROWN,
 EDMUND ADCOCK.